F. L. PHILLIPS.
GRAIN PICKLER.
APPLICATION FILED MAR. 22, 1918.

1,327,444.

Patented Jan. 6, 1920.

Inventor.
F. L. Phillips
by
H. J. S. Dennison
atty

UNITED STATES PATENT OFFICE.

FRANCIS LEWELLYN PHILLIPS, OF TUGASKE, SASKATCHEWAN, CANADA.

GRAIN-PICKLER.

1,327,444.　　　　　Specification of Letters Patent.　　　Patented Jan. 6, 1920.

Application filed March 22, 1918. Serial No. 223,938.

*To all whom it may concern:*

Be it known that I, FRANCIS LEWELLYN PHILLIPS, a subject of the King of Great Britain, and resident of Tugaske, Province of Saskatchewan, in the Dominion of Canada, have invented certain new and useful Improvements in Grain-Picklers, described in the following specification and illustrated in the accompanying drawings, that form part of the same.

The objects of this invention are, to provide a simple form of device in which the flow of the grain may be accurately regulated and spread uniformly in contact with a pickling solution to insure the grains being thoroughly washed.

The principal feature of the invention consists in the novel construction and arrangement of parts, whereby the flow of grain from the hopper is directed to fall centrally upon a spreading member arranged within a funnel and the pickling solution is sprayed upon the grain as it passes through the funnel by a sprayer member arranged beneath the spreading member.

A further feature of importance is the construction of the spraying nozzle which may be readily removed and cleansed.

In the accompanying drawings, Figure 1 is a perspective view of my improved pickling device, portions of the supporting legs being broken away.

Like numerals of reference indicate corresponding parts in each figure.

Figure 1:
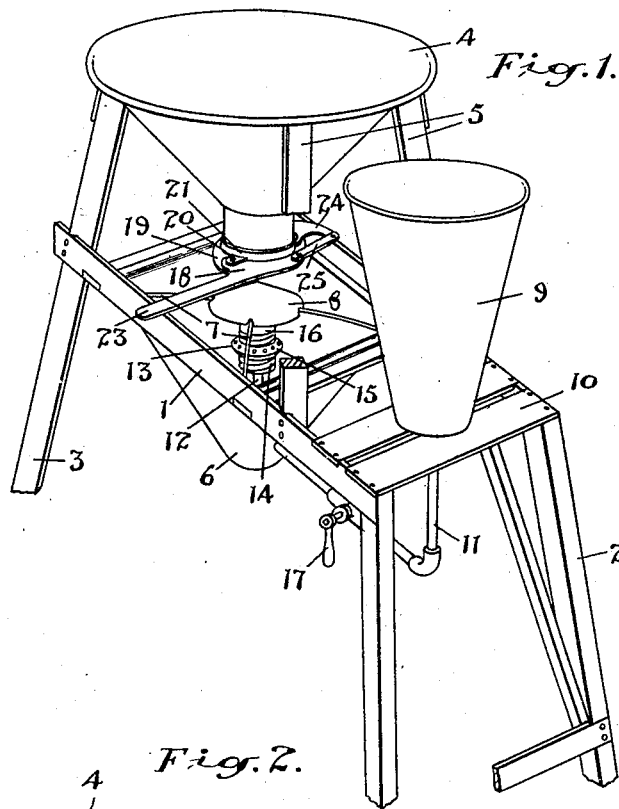

The device consists of a horizontally arranged frame 1 supported on the legs 2 and 3. The legs 3 extend upwardly above the frame 1 and support one side of the hopper 4, the other side being supported by the legs 5 which extend downwardly to the frame.

A funnel-shaped member 6 is secured in the frame 1 centrally below the hopper and a pair of rods 7 extend diagonally across the top thereof. These rods support a conical-shaped cap 8 of sheet metal which is arranged directly beneath the center of the hopper.

A suitable receptacle 9 for holding the pickling solution is supported on the platform 10 of the frame and a pipe 11 leads from the bottom thereof into the funnel 6, said pipe having an upwardly turned end 12.

A spraying nozzle 13 is supported on the end of the upturned portion of the pipe 11 and is formed with a lower threaded portion 14 secured to the pipe and a perforated spray member 15 which is threaded into the member 14 and has a threaded end inclosed by a cap 16.

The portion 15 of the sprayer is formed with a beveled perforated surface so that the fluid is sprayed in an upward and outward direction. The flow of the fluid is controlled by a tap 17 in the pipe 11. The flow of grain from the hopper is regulated by a pair of pivotal shutter members 18 and 19 formed of sheet metal and pivotally secured to the lugs 20 arranged diametrically opposite upon a collar 21 secured to the neck of the funnel.

Figure 3:
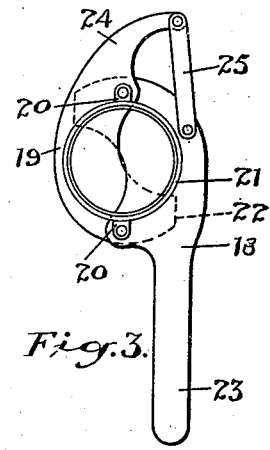
Fig. 3 is an enlarged detail plan view of the means for regulating the feed from the hopper shown in its closed position.
Figure 2:
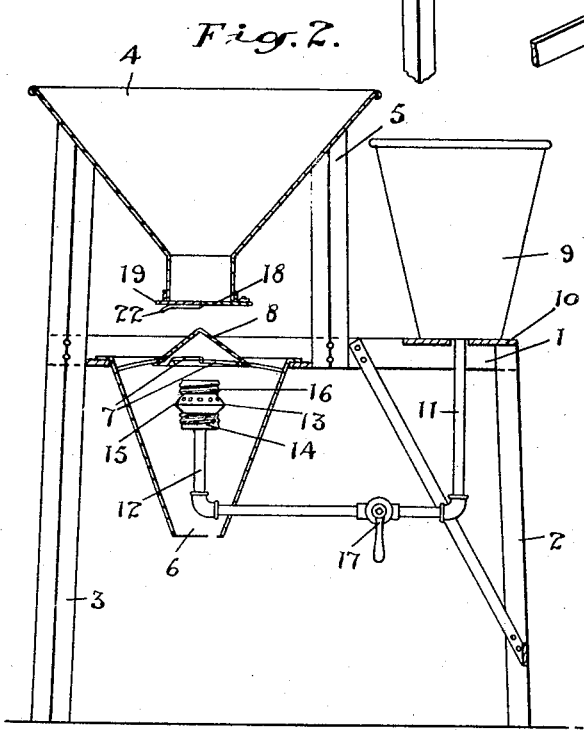
Fig. 2 is a longitudinal mid sectional view.
Figure 4:
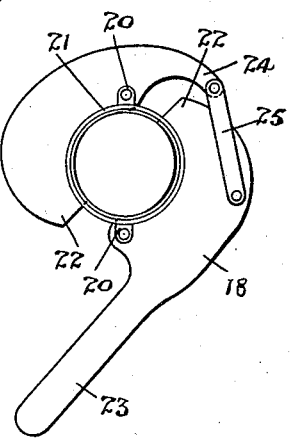
Fig. 4 is a view similar to Fig. 3 showing the parts in a full open position.

The inner sides of the shutter members are curved to correspond to the curvature of the funnel neck as is clearly shown in Fig. 4 and the outer ends 22 are each turned slightly downward so as to spring beneath the pivots thereby allowing the curved edges to come together to completely close the opening as is shown in Fig. 3. The shutter 18 is provided with a handle 23 and the shutter 19 is formed with an extending spur 24 which is connected by a link 25 to the member 18.

The manipulation of the member 18 by means of the handle 23 operates both members simultaneously so that they swing inwardly or outwardly on their pivots and constrict or enlarge the passage from the hopper so that the flow of grain is always central. The grain thus falls directly upon the center of the cone-shaped cap 8 and is spread thereby into the funnel, consequently the spraying fluid from the nozzle is brought into contact with the grain in its downward passage in the funnel.

What I claim as my invention is:—

1. In a grain pickler, the combination with a frame and a hopper supported thereon, of a converging funnel arranged below said hopper, rods arranged diagonally across the top of said funnel, a sheet metal cone supported upon said rods centrally beneath said hopper, means for regulating the feeding of the grain from the bottom of the hopper centrally upon the cone, and a spray nozzle arranged below the base of said cone and directing a spray of pickling fluid laterally outward from beneath said cone to strike the convergent walls of the funnel and mingle with the grain.

2. A grain pickler, comprising, a hopper, means for opening the bottom of the hopper centrally, a funnel arranged beneath the hopper, a cone-shaped member supported centrally beneath the hopper, a pickling fluid supply having a pipe extending centrally into the funnel, a threaded member on the upwardly turned end of said pipe, a spraying nozzle screwed into said threaded member having openings through the side, and a threaded cap closing the top of said spray nozzle.

FRANCIS LEWELLYN PHILLIPS.